United States Patent Office 2,814,885
Patented Dec. 3, 1957

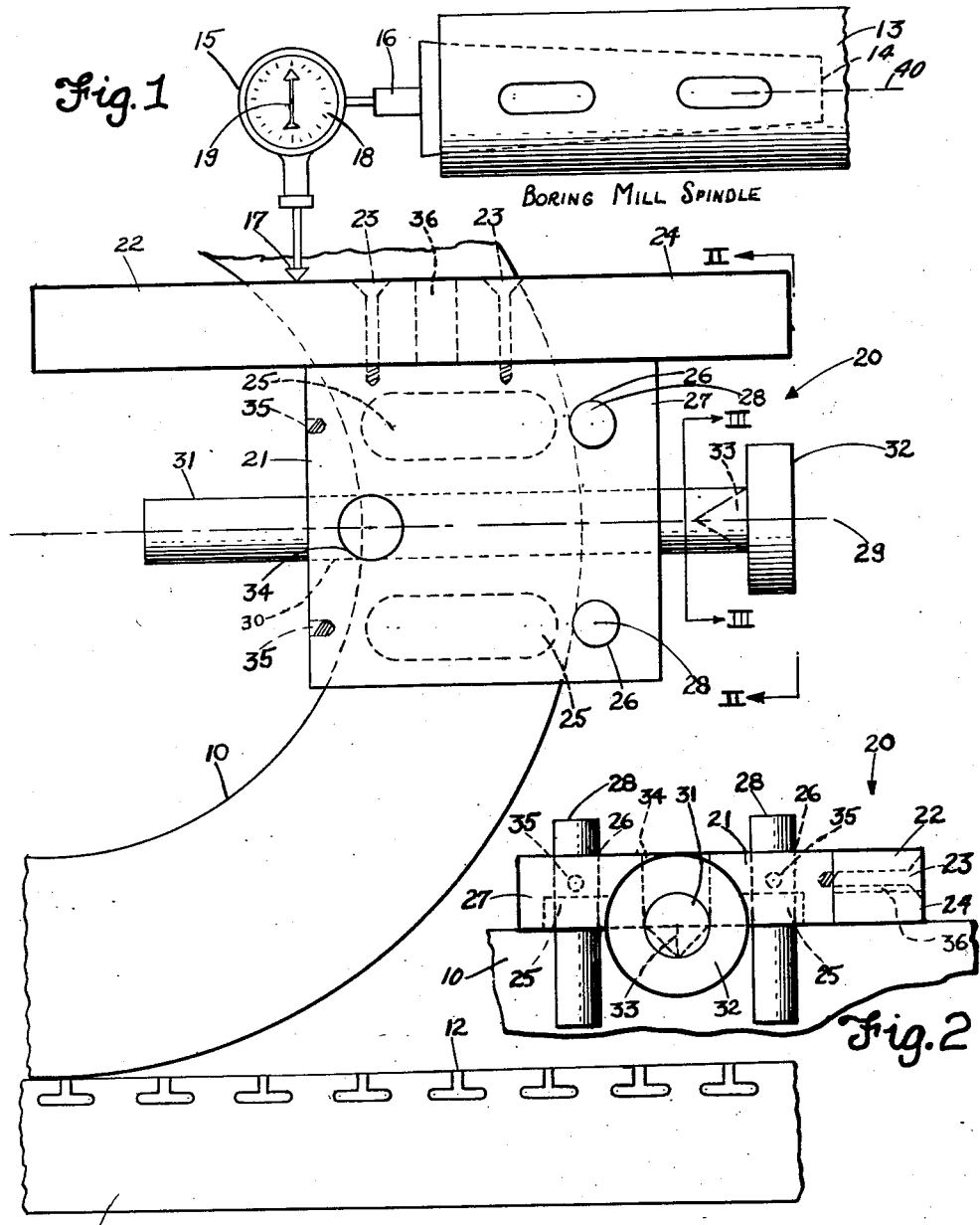

2,814,885

MACHINIST'S GAUGING FIXTURE

Budea Johns, New Castle, Pa.

Application October 27, 1955, Serial No. 543,229

9 Claims. (Cl. 33—185)

The present invention relates to gauges and center finding devices and more particularly to a machinist's gauge of particular utility in locating the center axes of annular and cylindrical workpieces.

It is an object of the invention to provide a gauging fixture that is especially useful in finding the center axis of annular or cylindrical workpieces for further working by machine driven tools, such as horizontal boring mills, precision planers, drill presses, or other like equipment, for example. It should be understood that many and various gauges and methods have been advanced for finding the center axis of an annular or cylindrical workpiece but that these fixtures and methods do not provide for the alignment of the axis of the spindle or the tool holding means with this found axis so that even though the center axis of a workpiece is known it is impossible to work along this found axis. In many cases this type of gauge is of no use to the machinist because it does not provide means for aligning the center axis of the cylindrical or annular workpiece with respect to the axis of the spindle of the machine tool.

In accordance with the above, I provide a machinist's gauge that is especially adapted for use with an indicator, an instrument now found in every machinist's tool box which is easily attached to the end of the tool-holding spindle and indicates whether the piece being gauged is aligned, to accurately align the center axis of the spindle with the center axis of the annular or cylindrical workpiece. In using this improved gauging fixture I have found it is possible to align the spindle of a boring mill to within ten thousandths of an inch with the center axis of a workpiece.

Yet another object of the invention is to provide a machinist's gauging fixture which is constructed in such a manner that it may be used in a number of different positions and orientations to find the center axis of a workpiece. The gauge is one of great versatility since it may be orientated to rest on any of the surfaces of the workpieces that have been machined to act as reference planes. The need for time-consuming and complicated machining or preparation of the faces of the workpiece prior to the use of the gauging fixture is also precluded. This feature is especially important when drilling or boring castings whose main surfaces may not need to be precision machined. In carrying out the gauging operation it is only necessary to have one normal surface or reference plane from which to work and this need be only the size of the fixture itself. The construction also provides another valuable feature in that the machinist's gauge is equally well adapted for use on different sized annular and cylindrical workpieces with literally no adjustments or change in the method of operation.

A further object, in accordance with the above stated aims of the invention, is to provide for a center finding gauge which is of the utmost simplicity to use. I provide a permanent magnet or magnets which hold the gauge to the workpiece without further support so that the operator may use both hands to find the center axis of the workpiece and then align the axis of the spindle center with the center axis.

Another object of the invention is to teach a simple and rugged gauge which is easy to manufacture in precision quality. It will be further observed that the main parts of the gauge consist of rectangular and square blocks and round stock which may be easily worked to obtain normal and true surfaces with a minimum of time.

The novel features which I consider to be characteristic of my invention are set forth with particularity in the appended claims. The invention itself, however, both as to its organization and method of operation, together with additional objects, advantages, and novel features thereof, will best be understood from the following description of a specific embodiment, especially when read in connection with the accompanying drawing, wherein:

Figure 1 of the drawing illustrates a horizontal view of a new and novel machinist's gauging fixture constructed in accordance with the teachings of my invention mounted on a workpiece for use with a horizontal boring mill to find the center axis of the annular workpiece;

Figure 2 is a vertical end view of the machinist's gauging fixture depicted in Figure 1 taken along the line II—II; and Figure 3 is an end sectional elevation taken along the section line III—III of Figure 1.

Referring now to the accompanying drawing and initially to Figure 1 thereof the numeral 10 designates an annular shaped workpiece having its main or longitudinal axis, not shown, extending into the drawing which is firmly clamped by means, not shown, to table 11 of a horizontal boring mill having a plurality of ways 12 therein. The table 11 is adapted for movement toward and away from the viewer looking directly at Figure 1. The horizontal boring mill is also equipped with a spindle 13 rotatable about its center axis 40 by suitable power means, not shown, which is adapted to receive any one of a number of tools in the tapered opening 14 and may be accurately and precisely moved in the vertical and longitudinal directions. It is therefore seen that the table 11 or the spindle 13 can be moved in cooperating fashion to expose any part of the annular object for further working.

In the illustrated embodiment of the invention the spindle 13 is shown carrying what is commonly known in the metal working art as an indicator 15 by means of a flexible connection 16. The connection 16 is such that the indicator 15 may be turned or twisted to obtain the specific orientation desired for any specific use. The indicator 15 itself is an instrument which shows the operator whether the axis 40 of the spindle 13 is aligned with respect to a reference surface in the correct manner. As shown, it has an indicating tip 17 which when forced upwardly records the amount of displacement on clock-like face 18 by means of a pointer arrow 19. These instruments are commercially available in various sizes and capacities, the degree of sensitivity varying from small fractions of an inch to much larger increments. They have had wide acceptance among machinists and are now standard equipment found in almost every tool box. The utility of this instrument when employed with the gauging fixture will become apparent upon further consideration of the intended operation of the complete mechanism.

The machinist's gauging fixture, designated generally by the numeral 20, consists mainly of a square or rectangular block 21 and an elongated rectangular leveler bar 22. Both of these pieces are approximately the same thickness with the leveler bar 22 rigidly secured to one side of the block 21 by means of the recessed metal screws 23. It should be understood that the various surfaces of the block 21 and leveler bar 22 are machined so as to be perfectly parallel or perpendicular to each other as the case may be from observing the drawing. The upper surface of the leveler bar 22 serves as a gauging surface 24 whose use will be hereinafter more fully explained.

The block 21 is provided with a pair of magnets 25 recessed in the bottom face thereof which are operative to firmly clamp the gauging fixture 20 to the workpiece 10.

A pair of vertically extending apertures 26 are provided in the block 21 and are aligned so as to be an equal distance from edge 27. In this manner a line drawn connecting the center axes of the apertures 26 would be directly perpendicular and normal to the gauging surface 24 of the leveler bar 22. Cooperating metal pins 28 are carried as dowels in the apertures 26 and, as seen in Figure 2 of the drawing, protrude beyond the top and bottom faces of the block 21.

For a complete understanding of the apparatus, an imaginary center line 29 has been drawn directly between the dowels 28 and the vertical apertures 26 which is parallel to the leveler bar 22 and as a consequence has the same relation with respect to the gauging surface 24. The center line 29 serves as the longitudinal axis for a semi-circular guide-way 30 that is in the bottom face and extends the length of the block 21 and is parallel to the gauging surface 24. The guide-way 30 is adapted to slidably receive a pin assembly comprising an elongated stem portion 31 of semi-circular cross section, a circular cap portion 32 on one end of the stem portion, and a triangular projection 33 near the cap portion 32 and having a blunt edge at its apex. The pin assembly is slidably received in the way 30 and is movable longitudinally therein but it does not prevent the magnets 25 from holding the gauging fixture flush against the surface of the workpiece.

The pin assembly itself is considerably longer than the block 21 in order that the triangular member 33 and the cap portion 32 are free to extend over the side edge of the workpiece. The triangular member 33 forms a blunt edge which is adapted to rest against the workpiece. It is contemplated that the distance from the blunt edge to the end of the stem portion 31 will be accurately known and may serve as a reference for any further necessary measurements made along the center line 29. For this reason the triangular member 33 is made of hard steel and the apex is blunt as a sharp point would soon wear with continued use.

Although the complete configuration of the machinist's gauging fixture has not been described, the elements recited are the essential parts and for a complete understanding of the invention the operation of the gauge to find the transverse center axis of an annular or cylindrical workpiece and align the same with the spindle of a machine driven tool should now be considered. In the following description the term "center axis" is employed to designate an axis passing transversely through the longitudinal or main axis of the workpiece. Thus, looking at Figure 1, such a center axis extends from left to right across the sheet and, for the particular arrangement shown, is co-extensive with center line 29.

In using the machinst's gauging fixture it is assumed that the operator has firmly clamped the workpiece 10 on the work table 11 of a horizontal boring mill. The table 11 has also been moved so that the end face of the workpiece is in approximately the same plane as that of the spindle 13. An indicator gauge 15 is attached to the spindle 13 and is orientated in a vertical direction by proper manipulation of the flexible coupling 16 to the position shown in Figure 1 of the drawing.

The gauging fixture 20 is then applied to the end face of the annular workpiece 10 as close to the center axis thereof as is obtainable upon inspection with the eye with the dowel pins 28 abutting the outer circumferential surface of the workpiece and the sliding pin assembly arranged so that the circular cap portion 32 extends beyond the surface and does not prohibit the magnets 25 from holding the gauge flush against the end face of the workpiece. With the fixture so positioned the spindle 13 is moved horizontally back and forth over the leveler bar 22 so that the indicating tip 17 traverses the gauging surface 24. Probably on the first try some relative deflection will be recorded on the face 18 by the pointer arrow 19 thereby telling the operator that the gauging surface 24 is not level and aligned in parallel relation to the axis 40 of the spindle 13 of the machine driven tool. The fixture 20 is then moved by the operator around the circumference of the workpiece until the indicator 15 designates that the gauging surface is parallel with respect to the axis of the spindle 13 as is the condition when no relative deflection is noted on the indicator. The meaning of this reading is that since the dowel pins 28 are the only members abutting the outer circumferential surface of the workpiece 10 it must follow, from the geometrical arrangement requiring the apertures 26 and dowels 28 to be aligned perpendicularly to the gauging surface 24, that a line drawn directly between the dowels 28, as the broken line 29, is the exact center axis of the workpiece with respect to the spindle.

As discussed above, the center axis of the workpiece therefore lies directly along the line 29. The problem now confronting the operator is that of moving the spindle 13 to a position where its axis 40 is in line with the found center axis of the workpiece. It is obvious that the spindle 13 is parallel to the found center axis but disposed upwardly therefrom. If this vertical distance were known it might be possible to lower the spindle the correct distance, but it is readily apparent that this operation is prone to many errors.

Therefore, for aligning the spindle 13 with the center axis I have provided the pin assembly which is an integral part of my gauging fixture. With the machinist's gauging fixture 20 held in clamped relation to the workpiece by the magnets 25 so that the line 29 designates the found center axis, the spindle 13 is moved to the right and lowered until the operator judges its axis is approximately aligned with the center line, and as a consequence, the pin assembly. The indicator gauge 15 is then orientated in the horizontal direction by means of the flexible coupling 16 until the indicating tip 17 rests upon the circumferential surface of the cap portion 32. The spindle may then be rotated slowly by hand while the indicating tip travels around the outer edge of the cap portion 32. If any relative deflection is noted on the face 18 of the indicator 15 the spindle 13 may be raised or lowered or moved laterally as dictated by the reading observed by the operator. The flexible coupling 16 will also have to be adjusted for these vertical movements but it is seen that with only a few attempts the operator will have the height of the spindle 13 and the connection 16 between the spindle and indicator arranged so that when the spindle is turned to force the indicator tip 17 around the edge of the cap portion 32 no relative deflection will be observed. When this is the case the axis 40 of the spindle must be in exact alignment with the found center axis of the workpiece as is readily apparent.

The gauging fixture may then be removed from the workpiece and the indicator and flexible connection removed to be replaced by some suitable tool, such as a bore boring bar, for further working of the workpiece. As an example, if it is desired to bore an aperture along a center axis parallel to the found center axis of the workpiece intermediate the ends thereof the workpiece or spindle is moved in a plane toward or away from the viewer looking at Figure 1 to the desired position and then the spindle is energized to complete the bore. It should be understood, however, that the gauging fixture is not limited to use with a horizontal boring mill but is equally applicable for use with drill presses, precision planers, and other like equipment.

The gauging fixture of the present invention is also adapted to find the vertical "center axis" which is in the same plane as but disposed transversely of the center axis found above and to this end the gauging fixture has a semi-circular guide way 36 in leveler bar 22 whereby the pin assembly may protrude therethrough when the leveler bar is attached to the block in normal relation to that shown in the drawing with screws 23 received in tapped apertures 35. With the leveler bar 22 so positioned the gauging fixture is especially adapted for finding the vertical center axis of an annular or cylindrical workpiece. There is no change in the method of operation except that the gauge is attached to the workpiece with the dowels abutting against the inner circumferential surface thereof and as a consequence the indicator is still able to traverse the gauging surface 24 and the cap portion 32.

Looking at Figure 1 of the drawing it is observed that the pin assembly is considerably longer than the block 21 so that the cap portion 32 and the triangular member 33 may protrude over the edge of the workpiece. As the pin assembly is slidably received in the way 30 it may be turned to extend over either the outside or inside edge of the workpiece, depending on which direction offers the most ease of access for the spindle. However, the configuration is somewhat limited in its intended use if the workpiece is of a large diameter or has a flanged shoulder as to require a longer stem portion on the pin assembly. An aperture 34 has therefore been provided so that if desired the gauging fixture may be positioned so that the dowels 28 are resting on the face of the workpiece 10 (the gauging fixture 20 is orientated vertically and displaced so the center axis of the aperture 34 is parallel to the face of the workpiece) and the stem of the pin assembly inserted in the aperture 34 to make the cap portion 32 accessable for movement of the indicator tip around the outer edge thereof.

It should thus be apparent that I have accomplished the objects initially set forth by providing a machinist's gauging fixture for finding the center axes of cylindrical or annular workpieces which is especially adapted for use with machine driven tool spindles such as are found on boring mills, drill presses, precision planers, etc. In the use of my guage it is insured that the found center axis of the workpiece is in perfect alignment with the axis of the spindle of the machine tool. The main difficulty with gauges advanced in the prior art is that no means or thought has been given to accurately and precisely aligning the center axis of the workpiece with the spindle thus, in many instances, rendering the gauges useless in machining operations where a high degree of accuracy is necessary.

Further, the invention teaches the use of a machinist's gauging fixture which is of great utility when used with an indicator attached by a flexible connection to the end of a spindle. It is also observed that the finding of the center axis involves a procedure of the utmost simplicity that does not require the machining of special surfaces and reference marks for its use. As is the usual case, an annular or cylindrical workpiece is first set up in a tool and an edge machined which serves as a basis for all further operation. I contemplate using this edge as the only necesary machined surface in the operation of the gauge. In using the gauge the operator merely attaches the fixture to the face of the workpiece, gauges along the leveler bar until the center axis is located, and then gauges around the circular cap portion until the axis of the spindle is aligned with the center axis of the workpiece. The use of magnets to hold the fixture to the workpiece also allows ease of operation as the operator may use both hands for the adjustment of the spindle.

Although I have disclosed a specific embodiment of the invention it should be understood that reference should be made to the following appended claims in determining the full scope of the invention as many changes may be made therein without departing from the scope or intent of the invention.

I claim:

1. A machinist's gauging fixture adapted for use in finding the center axis of cylindrical workpieces and align the found center axis with the axis of the spindle of a machine driven tool comprising a rectangular block, magnets recessed in said block for holding the same to a workpiece, a pair of spaced dowels aligned along a line parallel to one of the side edges of said block, a guide-way positioned directly between said dowels and being normal to said one of the side edges of said block, a rectangular leveler bar, means attaching said leveler bar to one of the side edges of said block, and a pin assembly slidably received in said guide-way comprising a stem portion and a cap portion carried on one end of said stem portion having a perfectly circular outer periphery.

2. Apparatus according to claim 1 further characterized in that said block has a through aperture therein having its axis disposed normally to and intersecting the axis of said guide-way, said pin assembly adapted to be received in said aperture and said guide-way in alternate positions, said leveler bar being detachably secured to said one of the side edges of said block, said leveler bar adapted to be detachably secured to others of said sides of said block, and a guide-way in said leveler bar adapted to be aligned with said guide-way in said block when said leveler bar is attached to one of said side edges of said block.

3. A machinist's gauging fixture adapted for use in finding the center axis of cylindrical workpieces and align the found center axis with the axis of the tool holding means of a power driven tool comprising a rectangular block having its meeting side edges perfectly normal to each other, a plurality of vertically extending dowels carried by said block spaced on a first line parallel to one of the said side edges thereof, aligning means positioned along a second line on said block directly between said dowels, and said second line being parallel with one of said side edges of said block.

4. Apparatus according to claim 3 further characterized in that said aligning means comprises a pin assembly, said pin assembly including an elongated stem portion, a cap portion mounted on one end of said stem portion, and said cap portion having a perfectly circular outer periphery.

5. Apparatus according to claim 4 further characterized in that said pin assembly is slidably received in a guide-way positioned along said second line, said guide-way being of semi-circular cross section, and said stem portion being of semi-circular cross section whereby said pin assembly does not prohibit said block from being positioned on a surface of said workpiece in flush relation therewith.

6. Apparatus according to claim 3 further comprising means for holding said block to a workpiece, and said last mentioned means comprising magnets recessed in said block.

7. Apparatus according to claim 3 further characterized in that said side edge of said block being parallel to said second line is normal with respect to said first line positioned directly between said dowels, and the arrangement being such when said block is positioned on the end face of a workpiece with said side edge thereof parallel to said second line aligned with the axis of the spindle of a power drive tool that the center axis of said workpiece is along said second line.

8. A machinist's gauging fixture adapted for use with an indicator for finding the center axis of a cylindrical workpiece and for then aligning the found center axis with the axis of the spindle of a power tool comprising a rectangular block having the meeting surfaces thereof normal to each other, a pair of vertical dowels carried by said block, said dowels being positioned and spaced along a first line parallel to one of the edges of said block, aligning means positioned along a second line directly between said dowels and said second line being normal to said first mentioned line, an enlongated leveler bar attached to one of the side edges of said block being parallel to said second line, and an indicator carried by the spindle of the tool, the arrangement being such when the gauge is positioned on the end face of a workpiece and said indicator detects no relative deflection in traversing said leveler bar that the center axis lies along said second line.

9. Apparatus according to claim 8 further characterized in that said aligning means comprises a pin assembly slidably received in said block along said line, said pin assembly having an enlarged head portion on one end thereof having a perfectly circular outer periphery whereby after said center axis is found the spindle may be moved to such a position that upon movement of the indicator around said cap portion no relative deflection is observed and the axis of said spindle is thus aligned with said found center axis.

References Cited in the file of this patent

UNITED STATES PATENTS

| | | |
|---|---|---|
| 2,470,635 | Moss | May 17, 1949 |
| 2,671,274 | Greenberger | Mar. 9, 1954 |